(12) United States Patent
Bergers

(10) Patent No.: US 8,371,061 B2
(45) Date of Patent: Feb. 12, 2013

(54) PERSONAL FISH SACK CARRIER

(76) Inventor: Jeffrey Lawrence Bergers, Grand Rapids, MI (US)

(*) Notice: Subject to any disclaimer, the term of this patent is extended or adjusted under 35 U.S.C. 154(b) by 329 days.

(21) Appl. No.: 11/759,962

(22) Filed: Jun. 8, 2007

(65) Prior Publication Data

US 2008/0301999 A1 Dec. 11, 2008

(51) Int. Cl.
*A01K 97/00* (2006.01)
*A01K 97/04* (2006.01)
(52) U.S. Cl. .............................. 43/55; 43/54.1
(58) Field of Classification Search ................... 43/54.1, 43/55–57
See application file for complete search history.

(56) References Cited

U.S. PATENT DOCUMENTS

| | | | | |
|---|---|---|---|---|
| 1,302,312 A * | 4/1919 | Cook | ............................. | 224/618 |
| 1,465,814 A * | 8/1923 | Forsburg | ............................. | 43/55 |
| 1,543,446 A * | 6/1925 | Lundstedt | ....................... | 43/54.1 |
| 2,253,688 A * | 8/1941 | Collins | ............................. | 43/55 |
| 2,323,318 A | 7/1943 | Farkas | | |
| 2,555,128 A | 5/1951 | Gutshall | | |
| 2,603,028 A * | 7/1952 | Roberts | ............................. | 43/55 |
| 2,295,889 A | 6/1957 | Garland | | |
| 3,053,005 A * | 9/1962 | Byers | ................................. | 43/55 |
| 3,674,188 A | 7/1972 | Anderson | | |
| 4,884,732 A * | 12/1989 | Sunderland | ................... | 224/666 |
| 5,467,907 A | 11/1995 | Celik | | |
| 6,435,390 B1 * | 8/2002 | Abramowicz | ................ | 224/629 |
| 2007/0205234 A1 * | 9/2007 | Lessmann | ..................... | 224/155 |

FOREIGN PATENT DOCUMENTS

| | | |
|---|---|---|
| GB | 2215172 | 9/1989 |
| JP | 2003134960 | 5/2003 |
| JP | 2004073022 | 3/2004 |

* cited by examiner

*Primary Examiner* — David Parsley

(57) ABSTRACT

The fish sack carrier is of a fish-like shape especially designed to carry a single, large fish, such as a mature salmon, secured upon the fisherman's back in a longitudinal position with its head downward. This position comfortably distributes the weight of the fish over the fisherman's shoulder and back and allows the fisherman to use his hands to carry other equipment. A unique shoulder strap system stabilizes and balances the fish in this position, and allows the simultaneous carrying of more fish by connecting additional fish sacks to a common shoulder strap. The fish sack carrier is constructed of lightweight and durable materials, is washable after use, and can be folded into a small packet for pocket storage.

1 Claim, 4 Drawing Sheets

PERSONAL FISH SACK CARRIER

CROSS REFERENCE TO RELATED APPLICATIONS

Not applicable.

BACKGROUND

1. Field of Invention

This invention relates to fish carrier devices, and more specifically to a fish sack used for the transport of larger fish such as salmon and steelhead by a wading or pedestrian fisherman.

2. Description of Prior Art

There are a number of fish carrier devices or receptacles invented for the carrying or transport of fish, particularly by the wading or pedestrian fisherman. These vary in form and method from simple cord stringers where the fish is carried by hand, to specially designed evaporative-cooled, bag shaped, receptacles or creels with an attached shoulder strap, where the fish is carried with its weight supported over the fisherman's shoulder.

There is no previously known bag shaped carrier device for a wading or pedestrian fisherman specially designed to efficiently and comfortably transport larger and heavier fish such as salmon or steelhead. There are several creels invented for the wading fisherman to transport smaller size fish such as stream trout. U.S. Pat. No. 2,795,889 to Garland (1957) discloses a mesh fish bag with a clip device that attaches to the belt of a wading fisherman. U.S. Pat. No. 2,555,128 to Gutshall (1951) discloses an evaporative-cooled fishing creel with a strap for carrying over one shoulder. U.S. Pat. No. 3,674,188 to Anderson (1972) discloses an evaporative-cooled fish and game receptacle with a shoulder strap. All of these inventions are similar in that they are designed to transport several smaller size fish either alive or preserved in a moisture cooled. None of these inventions is specially designed to transport large and heavy fish such as salmon in a secure, balanced, and comfortable position over sometimes long walking distances and across rugged terrain such as steep hills and fallen trees.

The use of fish stringers constructed of braided nylon with a ring at one end and a needle shaped point at the opposite end are commonly deployed by salmon and steelhead wading fishermen to transport their catch. The fish is carried by threading the needle end of the stringer through a passage on one side of the fish gills and mouth, and then the stringer ring, and then grasping the free end of the stringer by the hand or attaching to a stick. This carry method poses several problems:

(a) One fish can weigh upwards of 20 pounds and can exceed 30 inches in length. This is a difficult and strenuous method of transport especially when several fish need to be carried at once and the substantial weight imparts considerable strain on the fisherman's hand, wrist, arm, and shoulder.

(b) This method soils and damages the fish since the fish is dangling unbalanced by a stringer threaded through its mouth and gills and sometimes dragged along the ground when too heavy a fish is transported, or adverse walking terrain such as steep hills need to be navigated.

It is clear that, with the increasing popularity of fishing for larger size fish, such as salmon and steelhead, there is a need for a better method for the wading or pedestrian fisherman to comfortably and efficiently transport these large and heavy fish.

SUMMARY

A lightweight, durable, and washable personal fish carrier device with a suspension system design that provides ease of use, comfort, and economy. The fish sack carrier is designed to efficiently carry hands free a single large and heavy fish such as a salmon or steelhead in a balanced vertical position on the back of the wading or pedestrian fisherman. The unique suspension system design allows additional fish sacks to be simply connected to a single, common, shoulder strap with a minimum amount of effort.

OBJECT AND ADVANTAGES

Accordingly, the object of the fish sack carrier is to provide for the wading or pedestrian fisherman an efficient, comfortable, and affordable device for transporting larger and heavier fish such as salmon or steelhead across sometimes long distances and rugged walking terrain. Several objects and advantages of the present invention are:

(a) to provide an oblong, fish shaped enclosure to comfortably carry a single larger size fish in a vertical position with its head downward high upon the fisherman's back. This position balances, secures, and evenly distributes the weight of the fish upon the fisherman's back and shoulder.

(b) to provide a fish transport device that will properly support a single large fish and yet is capable of transporting additional fish by attaching a second or third fish sack to a single, common, shoulder strap.

(c) to provide a simple and lightweight shoulder strap design that allows a fast and easy method for lifting the fish over the shoulder, buckling, and adjusting.

(d) to provide a hands free fish transport device that can be carried over either shoulder and allows the fisherman to carry other objects with both free hands.

(e) to provide a fish transport device with one water resistant side to keep the fisherman's back clean and dry and the opposite side of mesh fabric to allow drainage, cooling, and for the sack to be immersed in water with adequate water circulation to keep the fish alive and preserved until transporting.

(f) to provide a fish transport device that keeps the fish clean during transport and is easily washable.

(g) to provide a strong, durable, and lightweight fish transport device that is foldable into a small packet that can be stored in a pocket for later use.

(h) to provide a carrying loop that can be used to comfortably hand carry the fish sack and can be used to lift and hold the fish enclosed in the sack over either shoulder.

(i) to provide a removable section of shoulder strap to allow the sack to be washed by laundering.

Further objects and advantages of the invention will become apparent from consideration of the drawings and ensuing description.

| REFERENCE NUMBERS IN DRAWINGS | | | |
|---|---|---|---|
| 10 | fish sack carrier | 12 | sack |
| 14 | suspension system | 16 | lower shoulder strap |
| 18 | upper shoulder strap | 20 | stitching |
| 22 | sack fabric | 24 | mesh fabric |
| 26 | sack bottom end | 28 | sack top opening |
| 30 | cinch strap | 32 | connector ring |

-continued

REFERENCE NUMBERS IN DRAWINGS

| 34 | hook and loop fabric | 36 | strap |
| 38 | carry loop | 40 | shoulder pad |
| 42 | female buckle end | 44 | lift loop |
| 46 | snap clip | 48 | male buckle end |
| 50 | strap adjuster | 52 | tie ring |
| 54 | lateral cord | 56 | snap clip |
| 58 | additional fish sack | | |

DESCRIPTION

FIGS. 1-4—Main Embodiment

Figure 1:
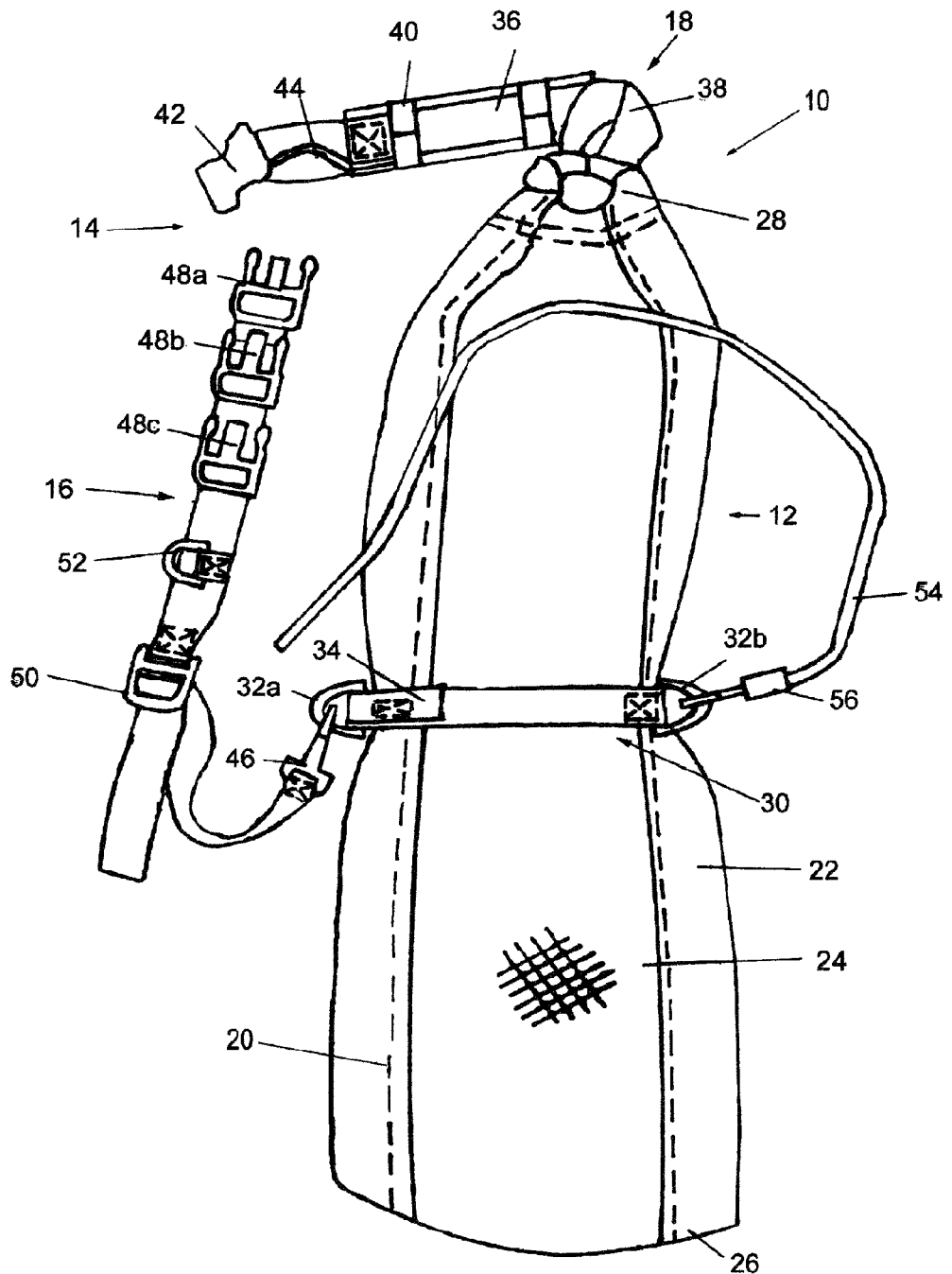
FIGS. 1 and 2 are perspective views of the fish sack when empty and when in use.
Figure 2:
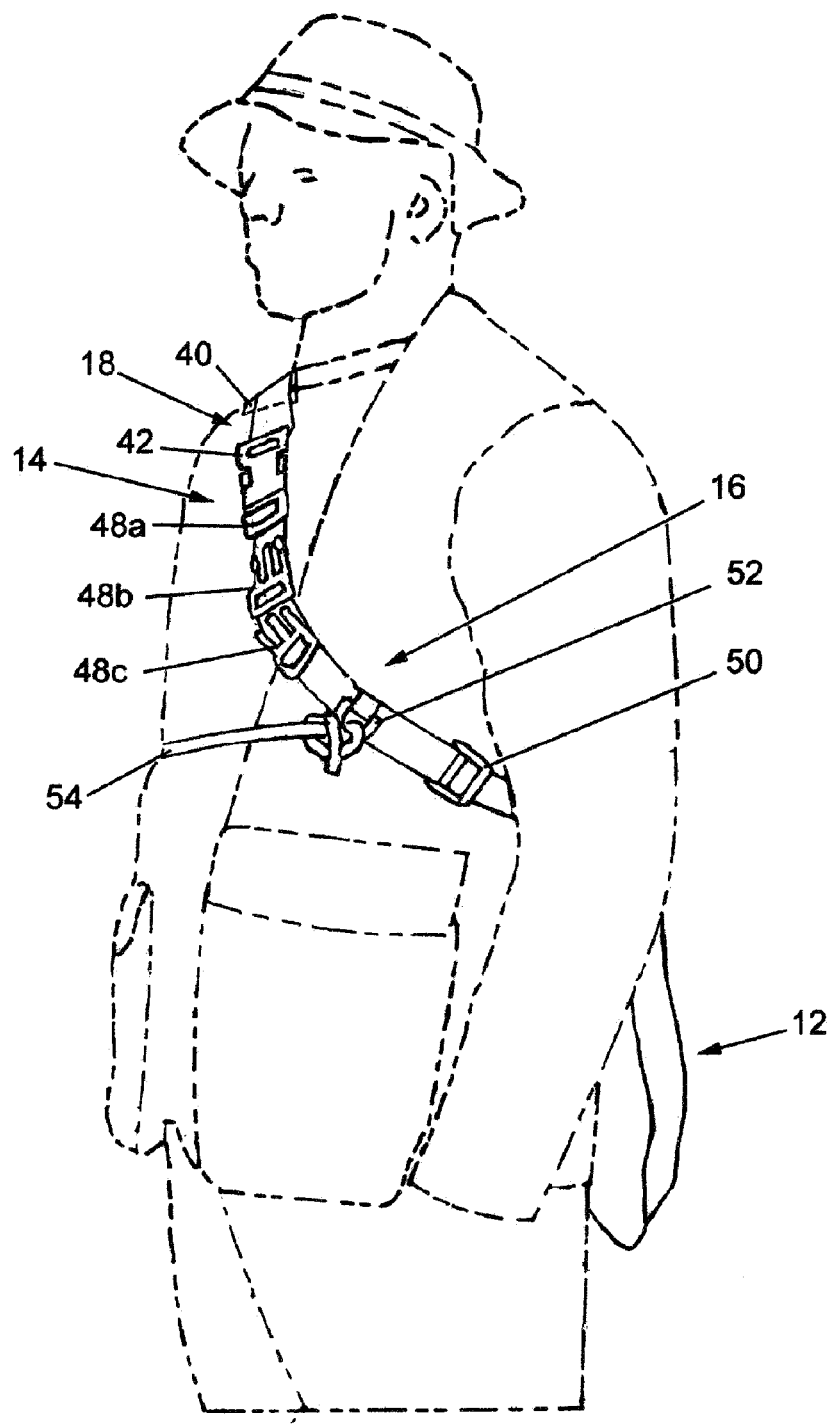

A preferred embodiment of the invention is shown FIG. 1. A fish sack carrier 10 is generally comprised of a sack 12 and a suspension system 14. Suspension system 14 includes a lower shoulder strap 16, upper shoulder strap 18, and lateral cord 54. FIG. 2 illustrates the invention in use.

Sack 12 is constructed of a lightweight, durable, and water-resistant fabric 22, such as nylon or polyester, forming the back and part of the front side of sack 12. Fabric 22 is rigidly attached, on the front side of sack 12, to a narrow, longitudinal, section of water-resistant, durable, fabric mesh 24, such as nylon or polyester, with stitching 20. Stitching 20 forms a closed sack bottom end 26 and a hem at sack top opening 28. A cinch strap 30 and a plastic connector ring 32a are attached together by stitching 20 to one side of sack 12 near the longitudinal center of sack 12. Cinch strap 30 threads through a second plastic connector ring 32b and encircles completely around the circumference of sack 12 and threads through connector ring 32a. Cinch strap 30 is 25 mm wide polypropylene webbing material and has a sewn section of hook and loop fastener fabric 34 for securing its tag end by pressing it onto the main length of cinch strap 30.

Upper shoulder strap 18 consists of a 40 mm wide strap 36, of a material such as heavyweight polypropylene, loosely threaded through the hem at the sack top opening 28. Both free ends of strap 36 exits the hem at the backside and center of top opening 28. One free end is sewn onto the main length of strap 36 to form a hand carry loop 38. The other free end of strap 36 threads through a shoulder pad 40, and then a plastic side-release female buckle end 42 and is folded back onto its main length and sewn at the same point as the other free end to form a lift loop 44.

Lower shoulder strap 16 consists of a 40 mm wide webbing, of a material such as heavyweight polypropylene, removeably attached to connector ring 32a with a plastic snap clip 46 sewn to the one free end of lower shoulder strap 16. A plastic strap adjuster 50 provides lower shoulder strap 16 length adjustments. The top free end of lower shoulder strap 16 threads through male buckle ends 48b and 48c and terminates by threading to male buckle end 48a. A plastic tie ring 52 is sewn to lower shoulder strap 16 between strap adjuster 50 and male buckle end 48c.

One free end of a 5 mm, nylon, lateral cord 54 is removably attached to connector ring 32b with a plastic snap clip 56.

Figure 3:
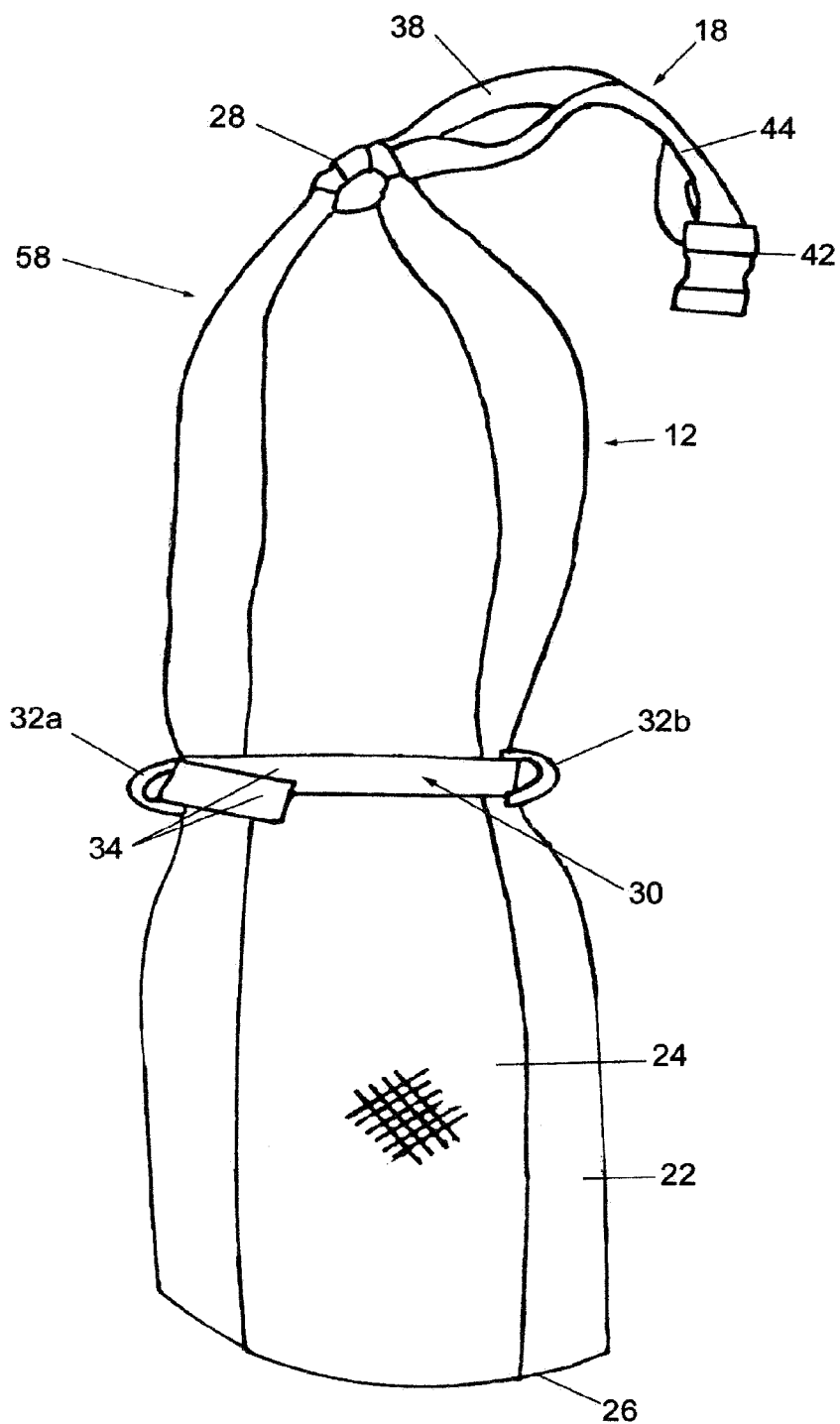
FIGS. 3 and 4 are perspective views of a second added fish sack when empty and in use.
Figure 4:
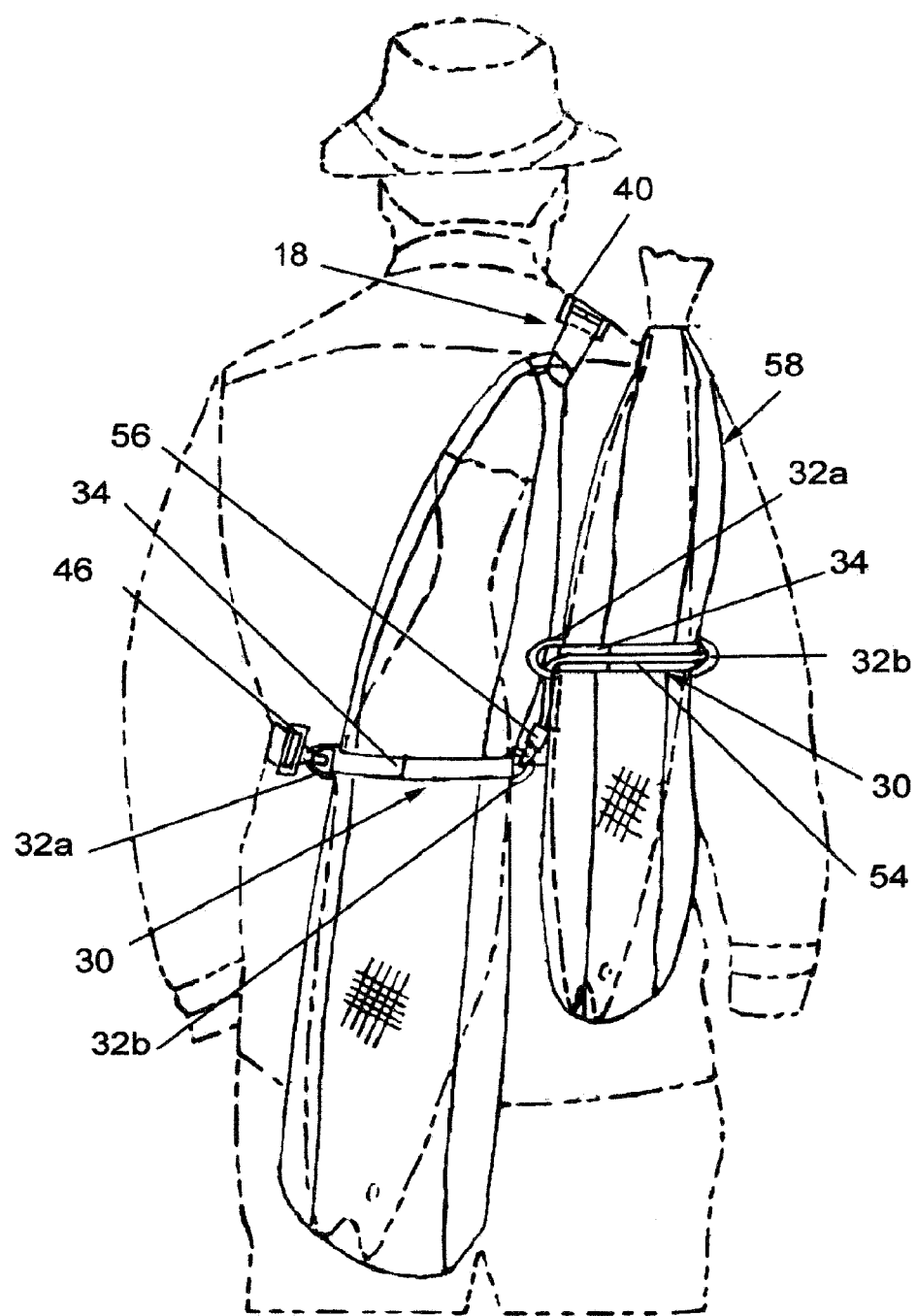

To provide for the transport of several fish, up to two additional fish sacks 58 can be connected to male buckle ends 48b and 48c already provided on common lower shoulder strap 16. FIGS. 3 and 4 show an additional fish sack 58 comprised of a sack 12 and upper shoulder strap 18. Connector rings 32a and 32b are included on the additional fish sack 58 to provide for fastening and securing of all sacks 12 together with a common lateral cord 54.

Operation—FIGS. 1-4

FIG. 1 shows fish sack carrier 10 in its open position ready for use. Lower shoulder strap 16 is attached to either connector ring 32a or 32b depending on which shoulder the fisherman prefers to carry the fish. Lateral cord 54 is attached to the connector ring 32a or 32b that is on the opposite side of sack 12 and lower shoulder strap 16.

Fish sack carrier 10 is used by inserting a fish head first into top opening 28 of sack 12. Cinch strap 30 is pulled snug around the girth of the fish and the tag end of cinch strap 30 is secured with the hook and loop fabric 34 to its main length. The user then closes top opening 28 of sack 12 by pulling and drawing upper shoulder strap 18. Shoulder pad 40 is adjusted to position by sliding along strap 36 toward sack top opening 28 exposing lift loop 44. Fish sack carrier 10 is now ready to be lifted upon the fisherman's shoulder.

FIG. 2 shows fish sack carrier 10 in use. The fisherman inserts his hand through lift loop 44 and lifts fish sack carrier 10 over the shoulder positioning upper shoulder strap 18 on top of the shoulder with water-resistant sack fabric 22 against the fisherman's back and mesh fabric 24 outward. While continuing to hold lift loop 44 with one hand, the user reaches around his back with his other hand to grasp and connect lower shoulder strap 16 to upper shoulder strap 18 by inserting male buckle end 48a into female buckle end 42. The user pulls the tag end of lower shoulder strap 16 protruding from the bottom side of strap adjuster 50 to tighten fish sack carrier 10 to their back, shoulder, and chest. Lastly, the fisherman reaches around the opposite side of their body from lower shoulder strap 16 and grasps lateral cord 54 pulling it around their side and chest to attach with a knot to tie ring 52. This secures fish sack carrier 10 upon the fisherman's back for transporting.

It is possible to insert additional fish into the same sack 12 if the fish are in combination smaller in girth than sack 12. A fish with a length longer than sack 12 can be carried with its tail extended outside top opening 28 of sack 12. Smaller fish can be carried using this method by drawing sack top opening 28 tightly around the fish tail. This keeps the fish weight as high up the back of the fisherman as possible, thus better stabilizing the fish and improving comfort.

FIG. 3 shows an additional fish sack 58 that can be used to transport several fish simultaneously. A second and third fish sack 58 can be carried by connecting to male buckle ends 48b and 48c provided on the common lower shoulder strap 16. FIG. 4 is a perspective view of a fisherman wearing two fish sacks. To carry the second fish sack 58, the user lifts the second fish sack 58 upon the same shoulder as fish sack carrier 10. The female buckle end 42 on second fish sack 58 connects to second additional male buckle end 48b on lower shoulder strap 16. A third fish sack 58 can be installed using this same method and connecting to third male buckle end 48c on lower shoulder strap 16. The user then threads lateral cord 54 through connector rings 32a and 32b on additional fish sack 58 before attaching lateral cord 54 to tie ring 52. This secures the fish for transport.

Sack 12 has a mesh fabric 24 front for cooling of the fish and draining of fluids. Fish sack carrier 10 can be immersed in water to keep the fish preserved. Mesh fabric 24 allows water circulation in sack 12. Lateral cord 54 can be used to tie and secure fish sack 12 in the water.

After use, sack 12 can be cleaned by rinsing with water or machine-washing after removing lower strap 16.

Fish sack carrier 10 can be folded or rolled up into a small, convenient, pocket size packet for storage and later use.

CONCLUSION, RAMIFICATIONS, AND SCOPE OF INVENTION

Accordingly, the reader will see that this invention provides for the wading or pedestrian fisherman a lightweight, durable, fish carrier device that can be easily operated and managed to comfortably and simultaneously transport one or several larger size fish such as salmon or steelhead, leaving both hands free to carry other objects. Furthermore, the fish sack carrier has the additional advantages in that:

- It permits a wide selection of materials to minimize the overall pack weight and to provide fish sack carriers of various quality and durability.
- It permits a wide selection of fabric and fastener color combinations.
- It permits several sack sizes to be manufactured tailored to the size or type of fish being sought. For instance, a slightly smaller sack could be produced for less mature salmon or steelhead.
- It permits the fish sack to be carried comfortably by hand with the carry loop integral to the upper shoulder strap, or held by hand with the fish sack over either shoulder with the lifting loop also integral to the upper shoulder strap.
- It permits the fish sack to be immersed in water to preserve the fish while continuing to fish. The lateral cord can be used as a stringer to tie to an object such as a log to secure the fish.

While my above description contains many specificities, these should not be construed as limitations on the scope of the invention, but rather as an exemplification of one preferred embodiment thereof. Many other variations are possible. For example, a sack of the same general shape could be designed with a slightly different suspension system, to position the sack horizontally instead of vertically on the fisherman's back. This sack could be enlarged in height to allow transport of several fish stacked horizontally in the same sack. Additionally, a vertical positioned sack could be manufactured to provide for carrying several fish by enlarging the width of the sack and attaching a narrow strip of fabric on the inside of the sack and parallel to the entire length of the sack. This creates separate vertical cells, or partitions, each of which would enclose one fish. Cinch straps attached at predetermined locations on the outside of the sack and threaded through the sack could also be used to create the separate cells. Several other means are possible for creating the partitions in this sack design.

Considerable modifications may be made to the preferred embodiment without departing from the principals of the invention. For example, additional cinch straps could be sewn at points along the length of the sack that would encircle the girth of the fish further stabilizing the fish in a vertical position. The upper shoulder strap could be removably attached to the sack and the section of strap passing through the sack top hem could be changed to a different construction such as rope. In addition, the size, color, and material of the straps, fasteners, and lateral cord could be changed. The selection and amount of fasteners could be changed. For example, the snap clips and connector rings could be made of metal or plastic. The lateral cord snap clip could be deleted and the cord tied directly to the sack connector ring to reduce cost. Deleting the interlocking buckles and snap clips could create a simpler, cheaper, one-piece shoulder strap. The sack seams could be adhesively bonded instead of sewn if vinyl surfaced fabric were utilized. Finally, a small area of the backside of the sack could be of mesh fabric to improve water circulation when the fish sack carrier is placed in the water, or, the mesh material could be deleted entirely.

Accordingly, the scope of the invention should be determined not by the embodiment(s) illustrated, but by the appended claims and their legal equivalents.

What is claimed is:

1. A personal fish carrier comprising:
   a) a sack having a top, bottom, front and back, attached together via stitching to form a closed bottom of said sack and forming a hem at an open top of said sack,
   b) a cinch strap disposed about medially between said top and said bottom of said sack, said cinch strap entirely encircling said sack, said cinch strap extending through first and second opposing connector rings disposed on opposite sides of said sack,
   c) a suspension system comprising, an upper shoulder strap, a lower shoulder strap, and a lateral cord,
   d) said upper shoulder strap having opposite spaced apart ends with one of said ends connected at the open end of the sack, and the other said ends having a female buckle,
   e) the lower shoulder strap having opposite spaced apart ends with one end of the lower shoulder strap having a plurality of male buckles disposed adjacent each other on said lower shoulder strap, each buckle adapted to be attached to an associated female buckle and the female buckle of the upper shoulder strap, the lower shoulder strap comprising, a strap adjuster disposed between each end of the lower shoulder strap with the lower shoulder strap extending through the strap adjuster, the lower shoulder strap having a first snap clip, said first snap clip attached directly to the first connector ring through which the cinch strap extends through on the end of the lower shoulder strap opposite the end of the lower shoulder strap with the male buckles,
   f) the lateral cord having opposite spaced apart ends with one end having a second snap clip, said second snap clip attached directly to the second connector ring through which the cinch strap extends, and the opposite end having attachment means to the upper or lower shoulder strap,
   wherein said sack is adapted to be supported on a back of a fisherman via the connection of the upper and lower shoulder straps with the female and one of the male buckles and,
   wherein a plurality of additional fish sacks are adapted to be attached to the male buckles on the upper shoulder strap not used to attach the upper and lower shoulder straps to the fisherman and these additional sacks adapted to be secured to the fisherman by wrapping the lateral cord around each additional sack and tying the lateral cord to the tie ring.

* * * * *